K. A. BLANCHER.
COMBINED TOURING AND DELIVERY VEHICLE.
APPLICATION FILED MAY 3, 1919.
1,361,359.
Patented Dec. 7, 1920.
3 SHEETS—SHEET 3.
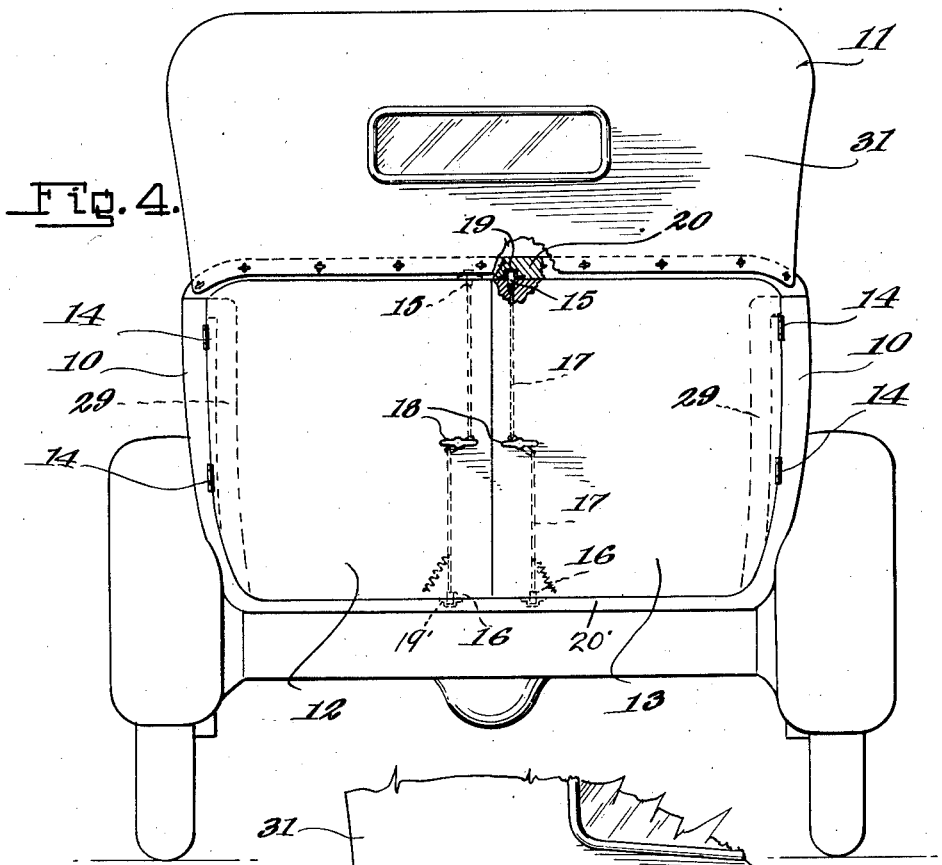
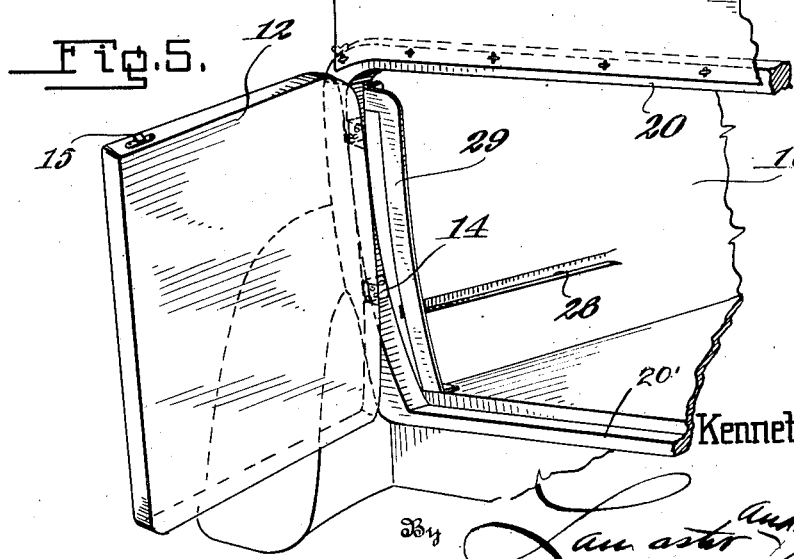
Inventor
Kenneth A. Blancher

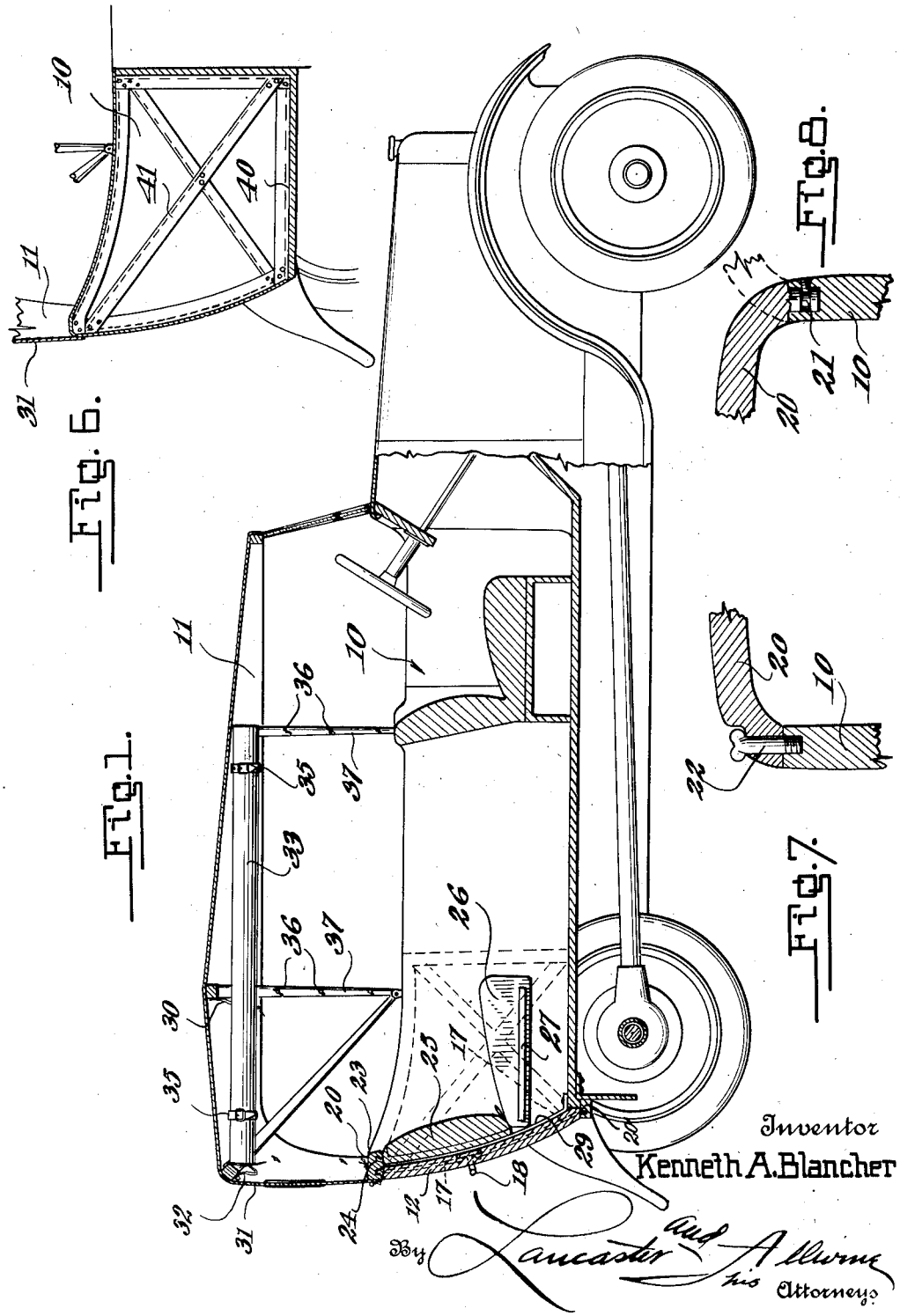

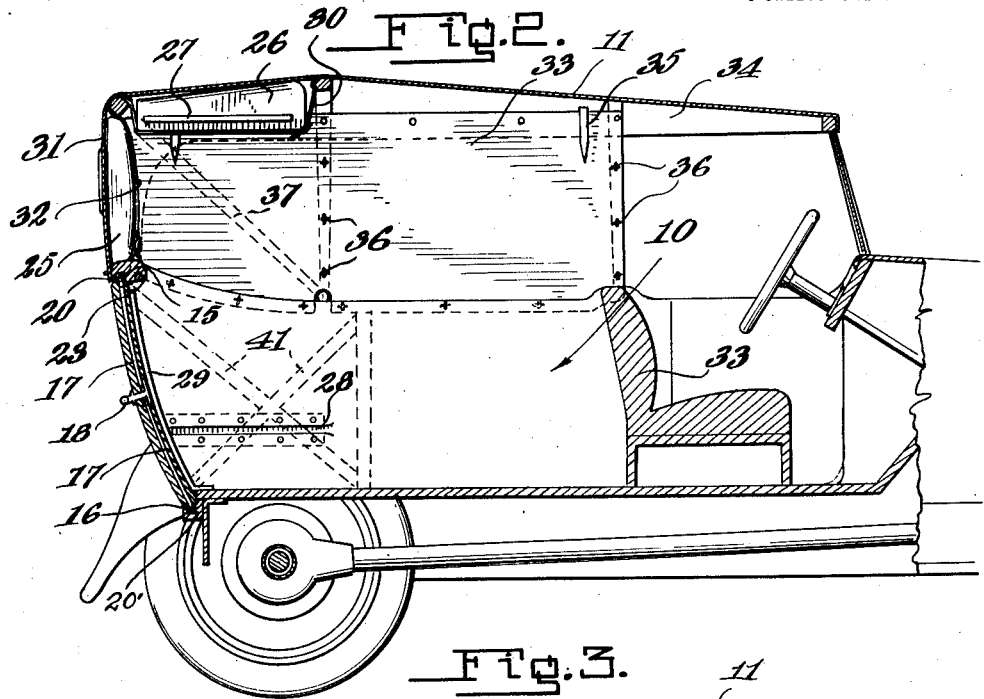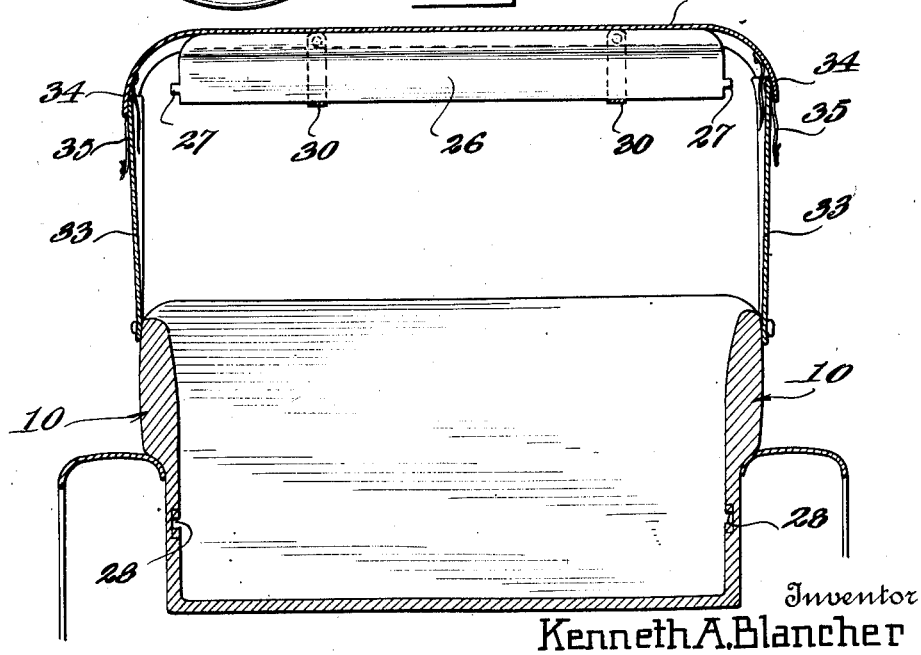

UNITED STATES PATENT OFFICE.

KENNETH A. BLANCHER, OF TORONTO, ONTARIO, CANADA.

COMBINED TOURING AND DELIVERY VEHICLE.

1,361,359.

Specification of Letters Patent. Patented Dec. 7, 1920.

Application filed May 3, 1919. Serial No. 294,493.

*To all whom it may concern:*

Be it known that I, KENNETH A. BLANCHER, a subject of the King of Great Britain, residing at Toronto, in the Province of Ontario and Dominion of Canada, have invented certain new and useful Improvements in Combined Touring and Delivery Vehicles, of which the following is a specification.

This invention relates to motor vehicles, and an object of the invention is to provide a convertible vehicle which may be used as a delivery or commercial car or a pleasure car for touring purposes, thereby providing a car which is particularly adaptable for use by grocers, or other merchants whose business will not warrant their purchase of both a pleasure and business car; a car which is particularly adapted for use by farmers, truck raisers, for bringing their goods to a town or city for sale or distribution, enabling them to convert the vehicle into an ordinary passenger or pleasure vehicle after they have disposed of their wares.

More specifically the invention comprehends the provision of a convertible motor vehicle in which the rear seat is removable, adapted to be suspended from the top of the vehicle, and in which the back or rear of the body of the vehicle is composed of a pair of doors which swing outwardly to permit access to the interior of the body of the vehicle from the rear and rearwardly from the front or driver's seat thereof, to permit the placing or removing of articles from the rear part of the vehicle body.

A further object of the invention is to provide curtains which, when the vehicle is used for pleasure purposes, are rolled up beneath the top of the vehicle and are adapted to be unrolled, when the vehicle is used for commercial purposes for screening the articles within the vehicle and also to prevent dust or dirt from settling thereon.

Other objects of the invention will appear in the following detailed description taken in connection with the accompanying drawings, forming a part of this specification and in which drawings:

Figure 1 is a longitudinal section through the vehicle body showing the same as used for touring, or pleasure purposes.

Fig. 2 is a fragmentary longitudinal section through the vehicle body showing the same as used for commercial or delivery purposes.

Fig. 3 is a vertical section through the rear end of the body when used for commercial purposes.

Fig. 4 is a rear end elevation of the vehicle showing parts in section.

Fig. 5 is a fragmentary perspective view illustrating one of the rear doors in an open position.

Fig. 6 is a fragmentary section through the body of the vehicle illustrating the manner of bracing the rear end thereof.

Fig. 7 is a fragmentary section through the rear end of the vehicle, illustrating, in connection with Fig. 8 of the drawings, the manner of mounting the support for the doors and the rear seat back, and Fig. 8 is a fragmentary section illustrating the pivotal mounting of the supports for the rear doors and back of the rear seats.

Referring more particularly to the drawings wherein like characters indicate like and corresponding parts throughout the several views, 10 indicates the body of the motor vehicle, which may be of any approved form, preferably of a touring car type; however, it is to be understood that the invention may be embodied in a sedan, limousine, touring car with foldable or rigid top or any of many approved styles or types of vehicle bodies, without departing from the spirit of this invention.

The body 10 has a top 11 of any approved form attached thereto and the rear end of the body 10 is provided with a pair of doors 12 and 13, hingedly supported as shown at 14 for swinging outwardly as clearly shown in Fig. 5 of the drawings to permit access to the interior of the body of the vehicle from the rear end thereof. Latches 15 and 16 are carried by the upper and lower edge respectively of each of the doors 12 and 13 and these latches are connected by means of rods 17 to handles 18 which extend rearwardly of the doors 12 and 13 to permit operation of the latches 15 and 16 by the handles 18 for opening the doors or locking them in closed position. The upper latches 15 of the rear doors 12 and 13 engage in suitable keepers 19, which are carried by a cross supporting bar 20. The lower latches of the doors 12 and 13 engage in suitable keepers 19' which are carried by a lower cross supporting bar 20' which forms a portion of the rear wall of the body. The bar 20 is pivotally connected, as shown at 21 to one side of the vehicle body 10 and a set screw 22 is inserted through the other end into the body to hold the bar against pivotal movement. The bar 20 is pivotally mounted so that it may be swung open, to permit the placing of a barrel or large article in the vehicle body, the latter being used for commercial purposes.

The bar 20 is provided with recesses 23 therein, which are adapted to receive arcuate pins 24 carried by the back 25 of the rear seat structure of the vehicle body to assist in properly supporting the back 25 of the rear seat structure when the vehicle body is used for pleasure or touring purposes. The portion 26 of the rear seat structure has laterally positioned longitudinally projecting ribs 27 which are adapted to engage in suitable ways 28 formed in the side of the vehicle body 10 for supporting the seat portions 26 in operative positions. The spring of the seat portions 26 will, by their expanding action assist the lugs 24 in holding the back 25 of the seat in its proper position. Suitable metal supporting strips 29 are carried by the vehicle body 10 and the back 25 rests against these members to prevent engagement of the back with the doors 12 and 13. Straps or analogous supporting devices 30 are carried by the top 11 of the vehicle, at the rear end of the same and they are adapted to support the seat portion 26 of the rear seat structure from the top of the vehicle when the latter is used for commercial purposes. The back 25 of the rear seat may be supported against the inner surface of the back 31 of the top 11 and upon the cross supporting bar 20 being maintained in proper position thereon by suitable straps 32, if it is so desired, thereby leaving the interior of the body of the vehicle rearwardly of the front seat 33 free of obstruction for containing various articles to be delivered or conveyed.

Curtains 33 which are preferably of relatively heavy material are attached to the depending side portions 34 of the top 11 and when the vehicle is used for passenger or pleasure purposes, these curtains may be rolled up as clearly shown in Fig. 1 of the drawings, being maintained in lowered position by suitable straps or analogous devices 35. These curtains 33 are lowered, to inclose the rear portion of the body of the vehicle when the latter is used for commercial purposes and prevents moisture, or dust, from settling upon the wares or articles contained within the vehicle. The curtains may be tightly stretched or maintained in their unrolled positions by means of suitable buttons 36 carried by the braces or supporting arms 37 of the top 11

In case the rear portion of the sides of the body 10 should be weakened by the forming of the doors 12 and 13 in the back of the body, suitable angle iron braces 40 and cross braces 41 are provided, for bracing the portions of the sides of the body adjacent to the rear end thereof When the vehicle is used for pleasure or passenger carrying or driving, the rear seat structure is assembled in the usual manner as shown in Fig. 1 of the drawings and the curtains 33 are preferably rolled up, thus giving the car substantially the same appearance as an ordinary touring car or any of the approved types desired, with which the invention is associated. However, when it is desired to use the motor vehicle or car for commercial purposes, the seat portion 26 is moved forwardly to move the ribs 27 out of the guides 28 and it is supported from the top 11 of the vehicle from the straps 30 as shown in Fig. 2 of the drawings, at which time the back 25 of the rear seat is supported against the inner surface of the back 31 of the top 11 by means of the straps 32, thus leaving the interior of the vehicle rearwardly of the front seat 33 free of obstruction for containing various articles to be transported by the motor vehicle. The curtains 33 are preferably lowered during the use of the vehicle for commercial purposes, both to screen or hide from view the contents of the rear portion of the car as well as to protect the said contents from dust or moisture. The rear portion of the car may be filled and emptied through the openings formed when the doors 12 and 13 are swung open and these doors are arranged so that one of them may be swung independently of the other. In cases where it is necessary to place relatively large articles such as barrels or the like in the vehicle body the supporting bar 20 is swung upon its pivot and the back 31 is raised upwardly to permit the insertion of the relatively large article into the body.

Changes in details may be made without departing from the spirit of this invention; but;

I claim:

1. In a combined pleasure and commercial vehicle, a body having a rear wall, a pair of doors forming a part of said rear wall, a cross supporting bar extending across said rear wall and pivotally connected to said body, means for preventing accidental pivotal movement of said cross bar, and means carried by said doors for detachably engaging said cross bar to hold the doors in closed position.

2. In a combined pleasure and commercial vehicle, a body having a rear wall, a pair of doors forming a portion of said rear wall, a cross supporting bar extending across said rear wall and pivotally connected to the body, means for preventing accidental pivotal movement of said supporting bar, a rear seat removably carried by the body and comprising a seat portion and a back portion, pins carried by said back portion for engagement with said cross bar for supporting said back portion in seat formation, and means for supporting said seat portion and back portions separately from said top.

3. In a combined pleasure and commercial vehicle, a body having a rear wall, a pair of doors forming a portion of said rear wall, a cross supporting bar extending across said rear wall and pivotally connected to the body, means for preventing accidental pivotal movement of said supporting bar, latches carried by said doors and engaging in said cross supporting bar to hold the doors against accidental movement, front and rear seats carried by said body, said rear seats comprising a seat portion and a back portion, ribs carried by the ends of said seat portion, said body provided with ways to receive said ribs, pins carried by said back portion and engaging in said cross supporting bar for supporting the back portion in seat formation with respect to the seat portion.

4. In a combined pleasure and commercial vehicle, a body having a rear wall, a pair of doors forming a portion of said rear wall, a cross supporting bar extending across said rear wall and pivotally connected to the body, means for preventing accidental pivotal movement of said supporting bar, latches carried by said doors and engaging in said cross supporting bar to lock the doors closed, front and rear seats carried by said body, said rear seats comprising a seat portion and a back portion, ribs carried by the ends of said seat portion, said body provided with ways to receive said ribs, pins carried by said back portion and engaging in said cross supporting bar for supporting the back portion in seat formation with respect to the seat portion, and means for supporting said seat and back portion in inoperative positions.

5. In a combined pleasure and commercial vehicle, the combination with an ordinary touring car body including a rear wall, of a pair of doors cut in said rear wall, a cross bar pivotally connected at one end to said body and extending across the body forming a part of said rear wall, said cross bar engaging the upper ends of said doors when the latter are closed.

6. In a combined pleasure and commercial vehicle, the combination with an ordinary touring car body including a rear wall, of a pair of doors cut in said rear wall, a cross bar pivotally connected at one end to said body and extending across the body forming a part of said rear wall, said cross bar engaging the upper end of said doors when the latter are closed, means carried by said doors and engaging said cross bar to hold the doors closed.

7. In a combined pleasure and commercial vehicle, the combination with an ordinary touring car body including a rear wall, of a cross bar pivotally connected at one end to said body and forming a part of said rear wall, means for preventing accidental pivotal movement of said cross bar, a removable rear seat structure including a seat back, arcuate pins carried by said seat back, said cross bar provided with recesses to receive said pin to hold said seat back in an operative position.

8. In a combined pleasure and commercial vehicle, the combination with an ordinary touring body including a rear wall, of a pair of doors cut in said wall, a cross bar pivotally connected at one end to said body forming a part of said rear wall, means for preventing accidental pivotal movement of said cross bar, said cross bar engaging the upper edges of said doors when the latter are closed, means carried by said doors and engaging said cross bars to hold the doors closed, a removable rear seat structure including a seat back, arcuate pins carried by said seat back, said cross bar provided with recesses to receive said pin to hold said seat back in an operative position.

9. In a combined pleasure and commercial vehicle, the combination with an ordinary touring car body including a rear wall, of a pair of doors cut in said rear wall, a cross bar pivotally connected to said body at one end, and extending across the body and forming a part of said rear wall, said cross bar engaging the upper edges of said doors when the latter are closed, the surface of said cross bar engaging the upper edges of said doors being provided with recesses, and latches carried by said doors and engaging in said recesses.

10. In a combined pleasure and commercial vehicle, the combination with an ordinary touring car body including a rear wall, of a pair of doors cut in said rear wall, an upper cross bar pivotally connected to said body at one end and extending across the body and forming a part of said rear wall, said upper cross bar engaging the upper edges of said doors when the latter are closed, and a lower cross bar engaging the lower edges of said doors when the latter are closed, the surface of said upper cross bar engaging the upper edges of said doors being provided with recesses, latches carried by said doors and engaging in said recesses, said lower cross bar provided with recesses in its upper surface, and latches carried by said doors for engaging in the recesses in said lower cross bar.

11. In a combined pleasure and commercial vehicle, the combination with an ordinary touring car body including a rear wall, of a pair of doors cut in said rear wall, an upper cross par pivotally connected to said body at one end, and extending across the body and forming a part of said rear wall, a lower cross bar connected to said body and extending across the body and forming a part of said rear wall, said upper cross bar engaging the upper edges of said doors when the latter are closed, the surface of said upper cross bar engaging the upper edges of said doors being provided with recesses, latches carried by said doors and engaging in said recesses, said lower cross bar provided with recesses in its upper surface, latches carried by said doors for engaging in the recesses in said lower cross bar, a removable rear seat structure including a back, arcuate pins carried by said seat back, said upper cross bar being provided with recesses to receive said arcuate pins to hold said seat back in operative position.

KENNETH A. BLANCHER.